(12) United States Patent
Horigome

(10) Patent No.: US 11,130,271 B2
(45) Date of Patent: Sep. 28, 2021

(54) BLOW MOLDING DEVICE AND BLOW MOLDING METHOD

(71) Applicant: NISSEI ASB MACHINE CO., LTD., Komoro (JP)

(72) Inventor: Hiroshi Horigome, Komoro (JP)

(73) Assignee: NISSEI ASB MACHINE CO., LTD., Nagano (JP)

(*) Notice: Subject to any disclaimer, the term of this patent is extended or adjusted under 35 U.S.C. 154(b) by 168 days.

(21) Appl. No.: 15/998,972

(22) PCT Filed: Feb. 16, 2017

(86) PCT No.: PCT/JP2017/005781
§ 371 (c)(1),
(2) Date: Aug. 17, 2018

(87) PCT Pub. No.: WO2017/142043
PCT Pub. Date: Aug. 24, 2017

(65) Prior Publication Data
US 2019/0389117 A1    Dec. 26, 2019

(30) Foreign Application Priority Data
Feb. 19, 2016   (JP) ................................ 2016-030471

(51) Int. Cl.
*B29C 49/06*     (2006.01)
*B29C 49/18*     (2006.01)
(Continued)

(52) U.S. Cl.
CPC .............. *B29C 49/06* (2013.01); *B29C 49/18* (2013.01); *B29B 2911/1402* (2013.01);
(Continued)

(58) Field of Classification Search
None
See application file for complete search history.

(56) References Cited

U.S. PATENT DOCUMENTS 3,850,562 A * 11/1974 Takeuchi .............. B29C 49/062
                                                        425/525
4,853,171 A    8/1989 Ajmera
(Continued)

FOREIGN PATENT DOCUMENTS

CN       1867443 A      11/2006
JP       6-47269        6/1994
(Continued)

OTHER PUBLICATIONS

International Search Report issued by the Japan Patent Office in corresponding International Application No. PCT/JP2017/005781, dated May 23, 2017.
(Continued)

*Primary Examiner* — Monica A Huson
(74) *Attorney, Agent, or Firm* — Greenblum & Bernstein, P.L.C.

(57) ABSTRACT

A blow molding device including: an injection molding unit manufacturing a bottomed preform made of resin; a blow molding unit; a support part supporting the preform; and a conveying unit conveying the support part to the blow molding unit, wherein the blow molding unit includes: a first mold for performing a first step of subjecting the preform to heat-set blowing at a first temperature; a second mold for performing a second step of blow-molding an intermediate molded article, which has been blow-molded by the heat-set blowing, at a second temperature lower than the first temperature, thereby manufacturing a container; and a movement unit capable of moving the first mold and the second mold relative to the support part so as to perform the first step and the second step continuously.

12 Claims, 13 Drawing Sheets

(51) Int. Cl.
 B29C 45/06 (2006.01)
 B29K 67/00 (2006.01)
 B29L 31/00 (2006.01)
 B65D 1/02 (2006.01)

(52) U.S. Cl.
 CPC ........ *B29C 45/06* (2013.01); *B29K 2067/003* (2013.01); *B29L 2031/7158* (2013.01); *B65D 1/02* (2013.01)

(56) References Cited

U.S. PATENT DOCUMENTS

| | | | |
|---|---|---|---|
| 5,085,822 | A | 2/1992 | Uehara et al. |
| 5,182,122 | A | 1/1993 | Uehara et al. |
| 2008/0042325 | A1 | 2/2008 | Imatani et al. |
| 2013/0087954 | A1 | 4/2013 | Tsuchiya |
| 2013/0241118 | A1 | 9/2013 | Sato et al. |
| 2014/0190924 | A1 | 7/2014 | Aoki et al. |
| 2015/0021343 | A1 | 1/2015 | Usami et al. |
| 2015/0166211 | A1 | 6/2015 | Aoki et al. |

FOREIGN PATENT DOCUMENTS

| | | |
|---|---|---|
| JP | 2002-79570 | 3/2002 |
| JP | 2004-34340 | 2/2004 |
| JP | 5503748 | 3/2014 |
| TW | 201347955 A | 12/2013 |

OTHER PUBLICATIONS

Written Opinion of the International Searching Authority issued by the Japan Patent Office in corresponding International Application No. PCT/JP2017/005781, dated May 23, 2017.
Taiwan Office Action issued in Application No. 106105470, dated Apr. 19, 2018.
Notification of First Office Action dated Nov. 25, 2019, from the State intellectual Property Office of the People's Republic of China in counterpart Chinese Patent Application 201780011885.7.
Communication from the European Patent Office enclosing the Extended European Search Report for Application No. 17 75 3298.3, dated Oct. 8, 2019, 5 pgs.

* cited by examiner

FIG. 3
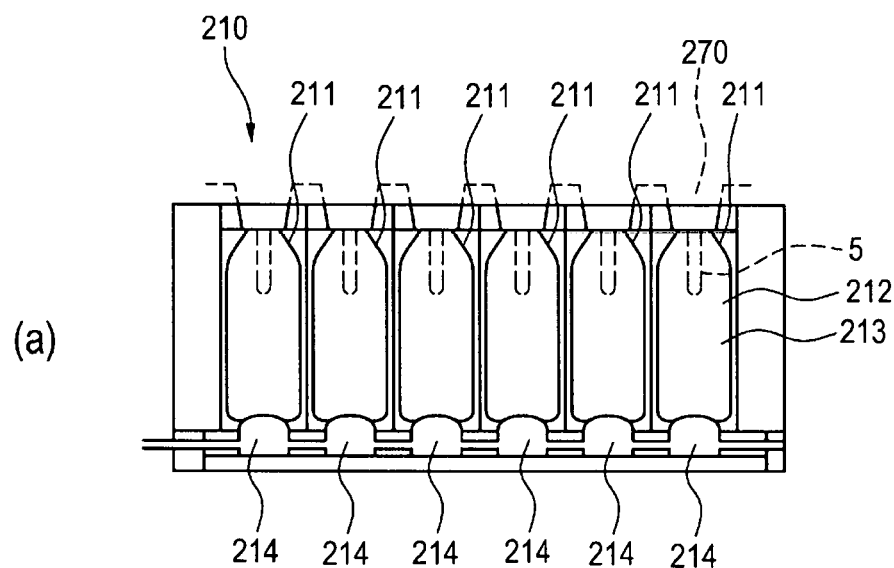
(a)
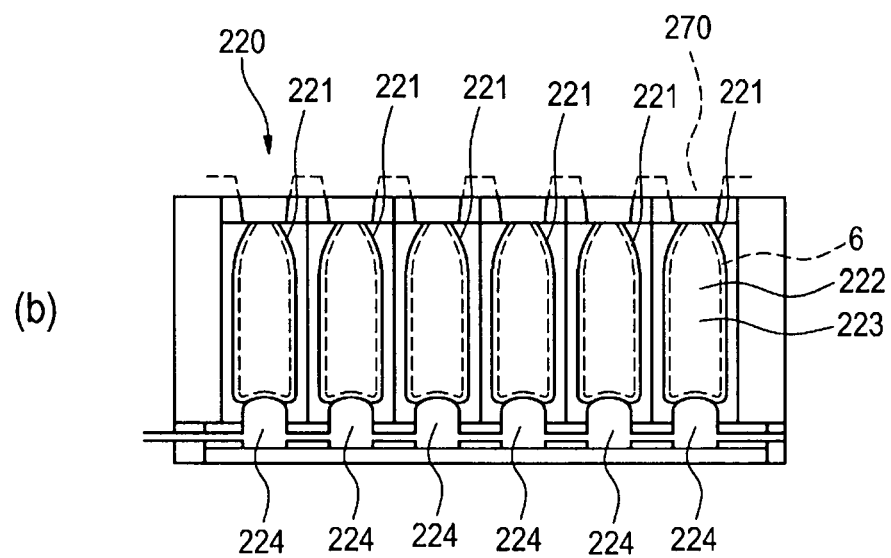
(b)

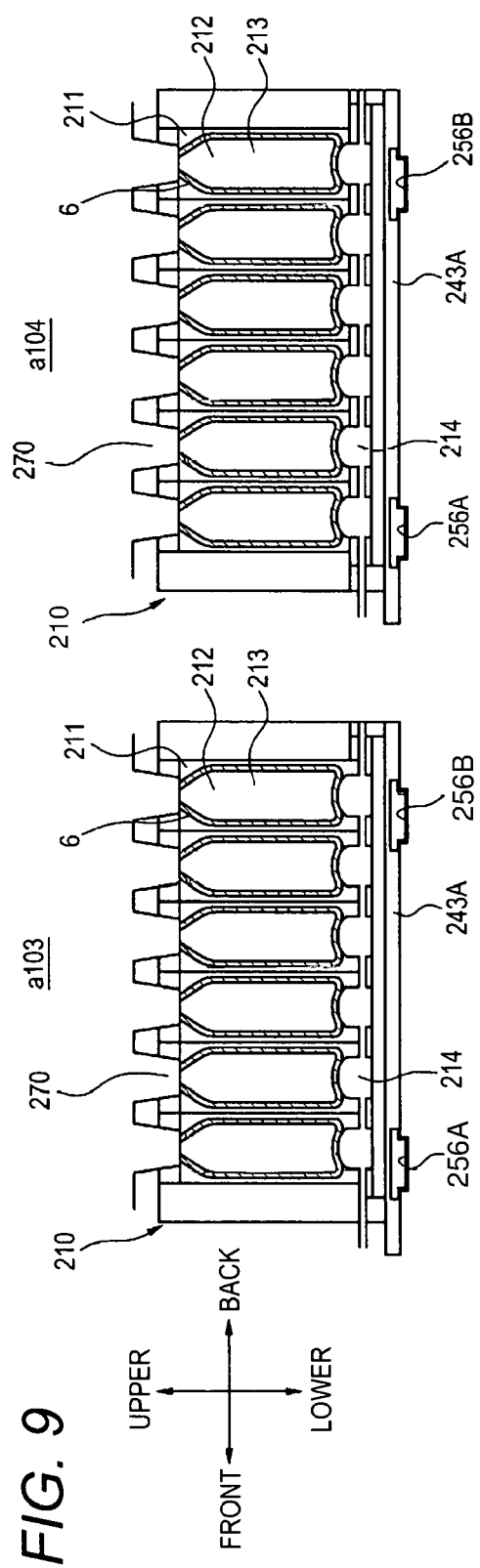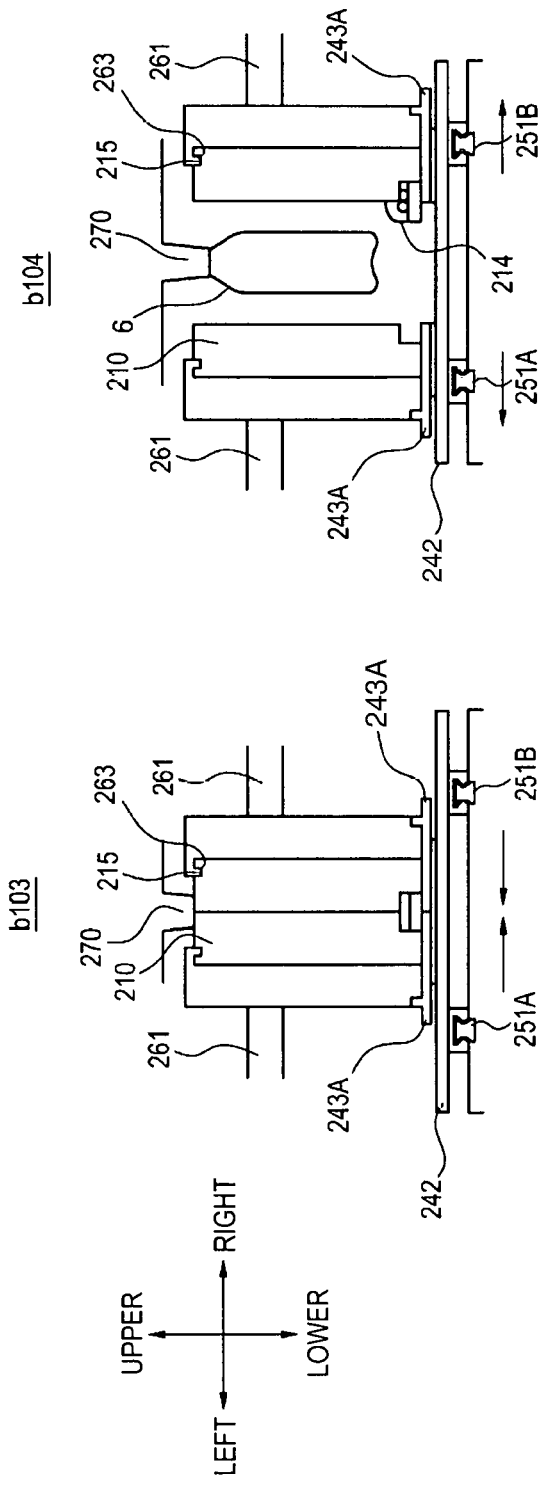
FIG. 9

BLOW MOLDING DEVICE AND BLOW MOLDING METHOD

This application is a national stage of International Application number PCT/JP2017/005781, filed Feb. 16, 2017, and claims the benefit of priority to Japan Application No. 2016-030471, filed Feb. 19, 2016, the content of which is incorporated herein by reference.

TECHNICAL FIELD

The present invention relates to a blow molding device and a blow molding method for molding a container made of resin.

BACKGROUND

A blow molding device is largely classified into a cold parison method (also referred to as 2-stage method) and a hot parison method (also referred to as 1-stage method).

Currently, when manufacturing a PET bottle having high heat resistance, a device in which the 2-stage method is adopted has been used in many cases (refer to Patent Document 1). In the device of the 2-stage method, an injection molding device for manufacturing a preform and a blow molding device are connected in an offline state. For this reason, after a preform manufactured in the injection molding device is once naturally cooled to a room temperature and stored at a predetermined place, the preform is supplied to the blow molding device.

Also, regarding the device in which the 1-stage method is adopted, a method of providing a PET bottle with heat resistance has been suggested (refer to Patent Document 2).

PRIOR ART DOCUMENT

Patent Document

Patent Document 1: Japanese Patent No. 5,503,748B
Patent Document 2: JP-A-H06-47269

SUMMARY OF THE INVENTION

Problem that the Invention is to Solve

With the device of the 2-stage method, it is possible to manufacture the PET bottle having high heat resistance. However, since it is necessary to once naturally cool the preform and then to heat the same to a temperature suitable for blowing in a heating part, the energy efficiency is low.

On the other hand, according to the device of the 1-stage method, since the preform is not cooled to the room temperature, the energy efficiency is higher than the 2-stage method. However, it is not possible to obtain the sufficient heat resistance, as compared to the 2-stage method.

It is therefore an object of the present invention to provide a blow molding device and a blow molding method capable of achieving improvements on both energy efficiency and heat resistance performance.

Means for Solving the Problems

A blow molding device including:
an injection molding unit configured to manufacture a bottomed preform made of resin,
a blow molding unit,
a support part configured to support the preform, and
a conveyance unit configured to convey the support part to the blow molding unit,
wherein the blow molding unit includes a first mold for performing a first process of subjecting the preform to heat treatment blowing at a first temperature, a second mold for performing a second process of blow-molding an intermediate molded product blow-molded as a result of the heat treatment blowing at a second temperature lower than the first temperature, thereby manufacturing a container, and a movement unit capable of moving the first mold and the second mold relative to the support part so as to perform the first process and the second process in succession.

According to the above configuration, since the preform manufactured by the injection molding unit is subjected to the heat-set blowing without being cooled to a room temperature, the energy for reheating the preform to a temperature suitable for blowing is not required. For this reason, it is possible to improve the energy efficiency. Also, since the first mold and the second mold are separately provided, it is possible to execute the first step of performing the heat-set blowing, independently of the second step to be then continuously executed. For this reason, it is possible to set the first temperature, which is to be used in the heat-set blowing of the first step, to a temperature higher than the second temperature, which is to be used in the second step, for example, to a temperature at which crystallization of resin is promoted, so that it is possible to obtain the container having sufficient heat resistance. Also, it is possible to execute the first step and the second step continuously and it is not necessary to execute processing such as temperature adjustment for avoiding lowering in temperature for the intermediate molded article, so that it is possible to improve the energy efficiency.

Also, in the blow molding device of the present invention, preferably,
the movement unit includes:
a long plate-shaped fixed part,
a first moveable part having a plate shape and capable of moving on the fixed part along a longitudinal direction of the fixed part, and
a second moveable part having a plate shape and capable of moving on the first moveable part in a direction perpendicularly intersecting with the longitudinal direction, and
the first mold and the second mold are fixed on the second moveable part.

According to the above configuration, it is possible to simply implement a mechanical configuration for continuously executing the first step and the second step.

Also, in the blow molding device of the present invention, a position at which the support part supports the preform in the first process and a position at which the support part supports the intermediate molded product in the second process are preferably the same.

According to the above configuration, it is possible to separately, smoothly and continuously perform the first step of subjecting the preform to the heat-set blowing at the first temperature and the second step of blow molding the intermediate molded article at the second temperature to manufacture the container.

Also, in the blow molding device of the present invention, preferably,
the first mold has a first inner wall surface for defining a first space in which the preform is disposed,
the second mold has a second inner wall surface for defining a second space in which the intermediate molded product is disposed, and
the first space is larger than the second space.

According to the above configuration, during the heat-set blowing, it is possible to largely blow-mold the preform, considering shrinkage after the heat-set blowing. Accordingly, it is possible to reduce residual stress (strain caused due to stretching orientation) remaining in the final formed article (container).

Also, preferably, the blow molding device of the present invention includes a temperature regulation unit for performing temperature regulation processing for making the preform manufactured by the injection molding unit approach a uniform temperature distribution, and the blow molding unit is configured to perform the heat treatment blowing for the preform that has been subjected to the temperature regulation processing by the temperature regulation unit.

In the preform immediately after being manufactured by the injection molding unit, there may be a deviation in the temperature distribution on the preform due to an influence of heat upon the injection. According to the above configuration, since the temperature adjustment processing is performed for the injection-molded preform and the heat-set blowing is performed for the preform after the temperature adjustment processing, it is possible to reduce the temperature deviation, which may be caused on the intermediate molded article or the final container, so that the non-uniform thickness is difficult to be caused. Thereby, it is possible to obtain the more stable heat resistance.

Also, a blow molding method of the present invention includes:

an injection molding process of injection molding a bottomed preform made of resin, and a continuous blowing process of performing in succession a first process of subjecting the preform manufactured in the injection molding process to heat treatment blowing at a first temperature by using a first mold, and a second process of blow molding an intermediate molded product blow-molded as a result of the heat treatment blowing at a second temperature lower than the first temperature by using a second mold, thereby manufacturing a container.

According to the above method, since it is possible to execute the first step of performing the heat-set blowing by using the first mold, independently of the second step in which the second mold is to be used, it is possible to set the first temperature, which is to be used in the heat-set blowing of the first step, to a temperature higher than the second temperature, which is to be used in the second step, for example, to a temperature at which crystallization of resin is promoted, so that it is possible to obtain the container having sufficient heat resistance. Also, since the first step and the second step are executed continuously, it is not necessary to execute processing such as temperature adjustment for avoiding lowering in temperature for the intermediate molded article, so that it is possible to improve the energy efficiency. Like this, according to the above configuration, it is possible to provide the blow molding method capable of achieving improvements on both the energy efficiency and the heat resistance performance.

Also, preferably, the blow molding method of the present invention includes a temperature regulation process of performing temperature regulation processing for making the preform manufactured in the injection molding process approach a uniform temperature distribution, after the injection molding process, and in the first process of the continuous blowing process, the heat treatment blowing is performed for the preform that has been subjected to the temperature regulation processing in the temperature regulation process.

In the preform immediately after being manufactured by an injection molding unit, there may be a deviation in the temperature distribution on the preform due to an influence of heat upon the injection. According to the above method, since the temperature adjustment processing is performed for the injection-molded preform and the heat-set blowing is performed for the preform after the temperature adjustment processing, it is possible to reduce the temperature deviation, which may be caused on the intermediate molded article or the final container, so that the non-uniform thickness is difficult to be caused. Thereby, it is possible to obtain the more stable heat resistance.

Also, in the blow molding method of the present invention, the first temperature is preferably a temperature at which crystallization of polyethylene terephthalate is promoted.

According to the above method, it is possible to obtain the container having higher heat resistance.

Effects of the Invention

According to the present invention, it is possible to provide the blow molding device and the blow molding method capable of achieving improvements on both the energy efficiency and the heat resistance performance.

BRIEF DESCRIPTION OF DRAWINGS

FIGS. 3(a) and 3(b) illustrate configurations of mold units.

FIG. 9 depicts each step from mold clamping to mold opening of heat-set blowing in the blow molding method.

MODE FOR CARRYING OUT THE INVENTION

Figure 1:
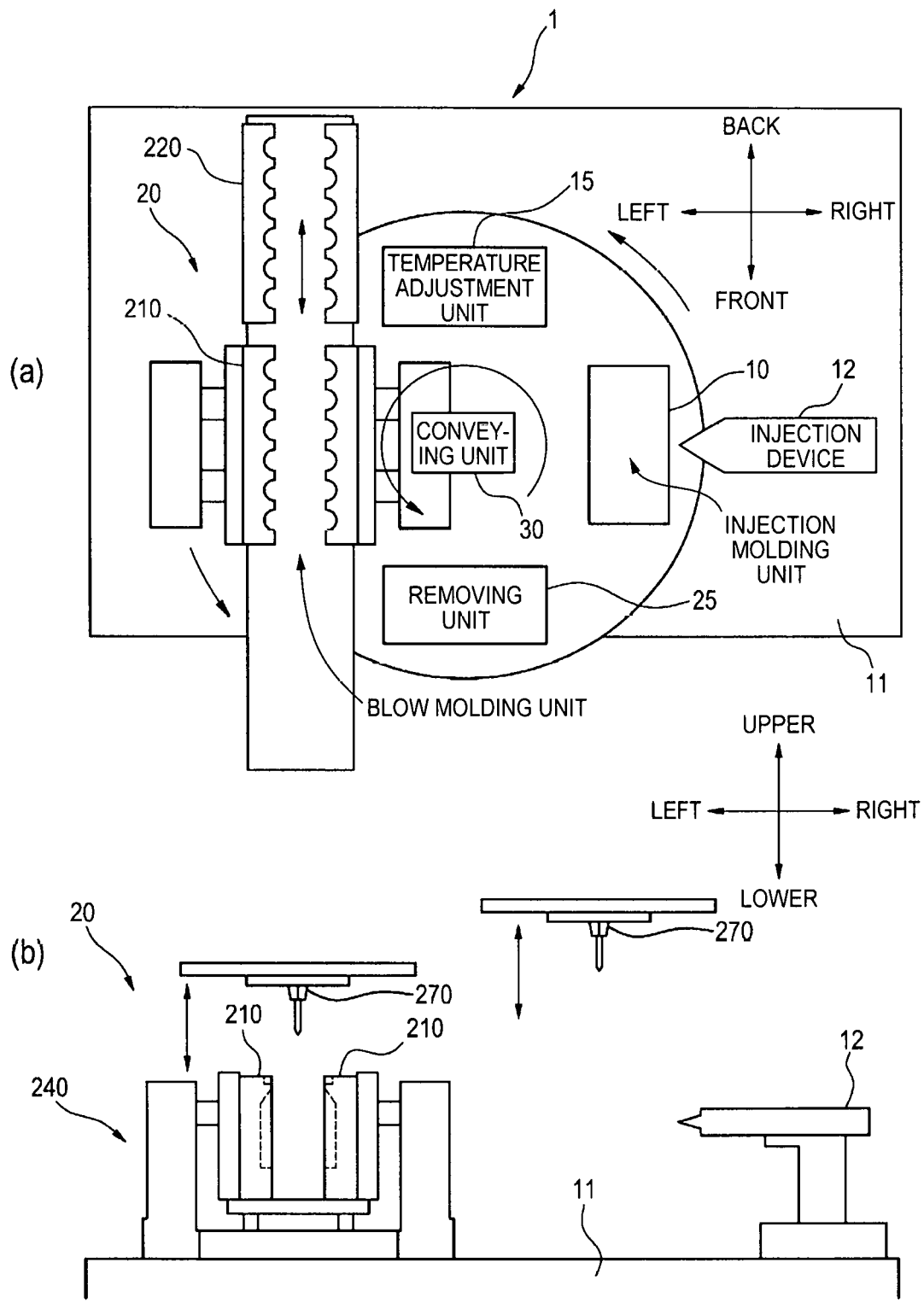
FIG. 1(a) depicts a configuration of a blow molding device of the present invention.
FIG. 1(b) is a horizontal view of FIG. 1(a).

Hereinafter, an example of an illustrative embodiment will be described with reference to the drawings.

First, a blow molding device is described with reference to FIG. 1.

In the respective drawings, a front and back direction, a right and left direction and an upper and lower direction are shown. In the example, the respective directions are perpendicular to each other. The front and back direction is an example of a direction in which two mold units 210, 220 (which will be described later) are to slide on guide rails. The right and left direction is an example of a moving direction of a mold when a first mold unit 210 and a second mold unit 220 (which will be described later) are to open or clamp a mold. The upper and lower direction is an example of a direction in which a support part 270 (which will be described later) is to move up and down. Each direction is defined based on a direction in which an operator (observer) sees a device when the device is placed on a horizontal surface. However, the denotations of the directions are exemplary and are not construed to limit the application scope of the invention.

A blow molding device 1 includes an injection molding unit 10 for manufacturing a preform and a temperature adjustment unit 15 for adjusting a temperature of the manufactured preform, on a base 11. The injection molding unit 10 is connected with an injection device 12 that supplies resin, which is a source material of a container. Also, the blow molding device 1 includes a blow molding unit 20 for double blowing the preform to manufacture a container and a removing unit 25 for removing the manufactured container, on the base 1.

In this way, the blow molding device 1 is configured as a 1-stage type blow molding device as a whole.

The injection molding unit 10, the temperature adjustment unit 15, the blow molding unit 20 and the removing unit 25 are provided at rotated positions by predetermined angles (90°, in this example) about a conveying unit (conveying mechanism) 30. The conveying unit 30 is configured by a rotating plate and the like, and the rotating plate is mounted with four neck molds. The preform manufactured in the injection molding unit 10 or the container manufactured in the blow molding unit 20 is supported at its mouth part by the neck molds, and is conveyed to each unit in accordance with rotation of the rotating plate. In the meantime, the rotating plate of the example is configured by four fan-shaped conveying plates. The rotating plate arranged at positions of the injection molding unit 10 and the blow molding unit 20 are capable of moving up and down.

The injection molding unit 10 includes an injection cavity mold, an injection core mold, and the like, which are not shown. The injection molding unit 10 is configured to cause a resin material to flow from the injection device 12 into a preform-shaped space, which is formed as the molds are closed, thereby manufacturing a bottomed cylindrical preform.

The temperature adjustment unit 15 is configured to perform temperature adjustment for making a temperature distribution of the preform manufactured by the injection molding unit 10 become close to a uniform temperature distribution over the entire preform. Also, the temperature adjustment unit 15 is configured to adjust the preform to a temperature (for example, about 90° C. to 100° C.) suitable for stretching blowing. For example, the preform is disposed in a temperature adjustment pot, and a blowing pressure is introduced from a temperature adjustment blow core mold fitted in a mouth part of the preform. By the introduced blowing pressure, the preform is preliminarily blown and is contacted to an inner surface of the temperature adjustment pot, so that the preform is adjusted to a temperature suitable for blowing. Also, the preform may be temperature-adjusted in a contactless state by heat generated from the temperature adjustment (heating) core mold or temperature adjustment (heating) pot without performing the preliminary blowing.

The blow molding unit 20 is configured to continuously perform heat-set blowing and final blowing (which will be described later) for the preform temperature-adjusted in the temperature adjustment unit 15, thereby manufacturing a container made of resin. The blow molding unit 20 includes two independent mold units 210, 220 configured to be moveable in the front and back direction so as to perform the heat-set blowing and the final blowing.

The removing unit 25 is configured to remove the container to an outside of the blow molding device 1 by opening a neck part of the container manufactured in the blow molding unit 20 from the neck mold.

Subsequently, the blow molding unit 20 is described in detail with reference to FIGS. 1 to 6.

Figure 2:
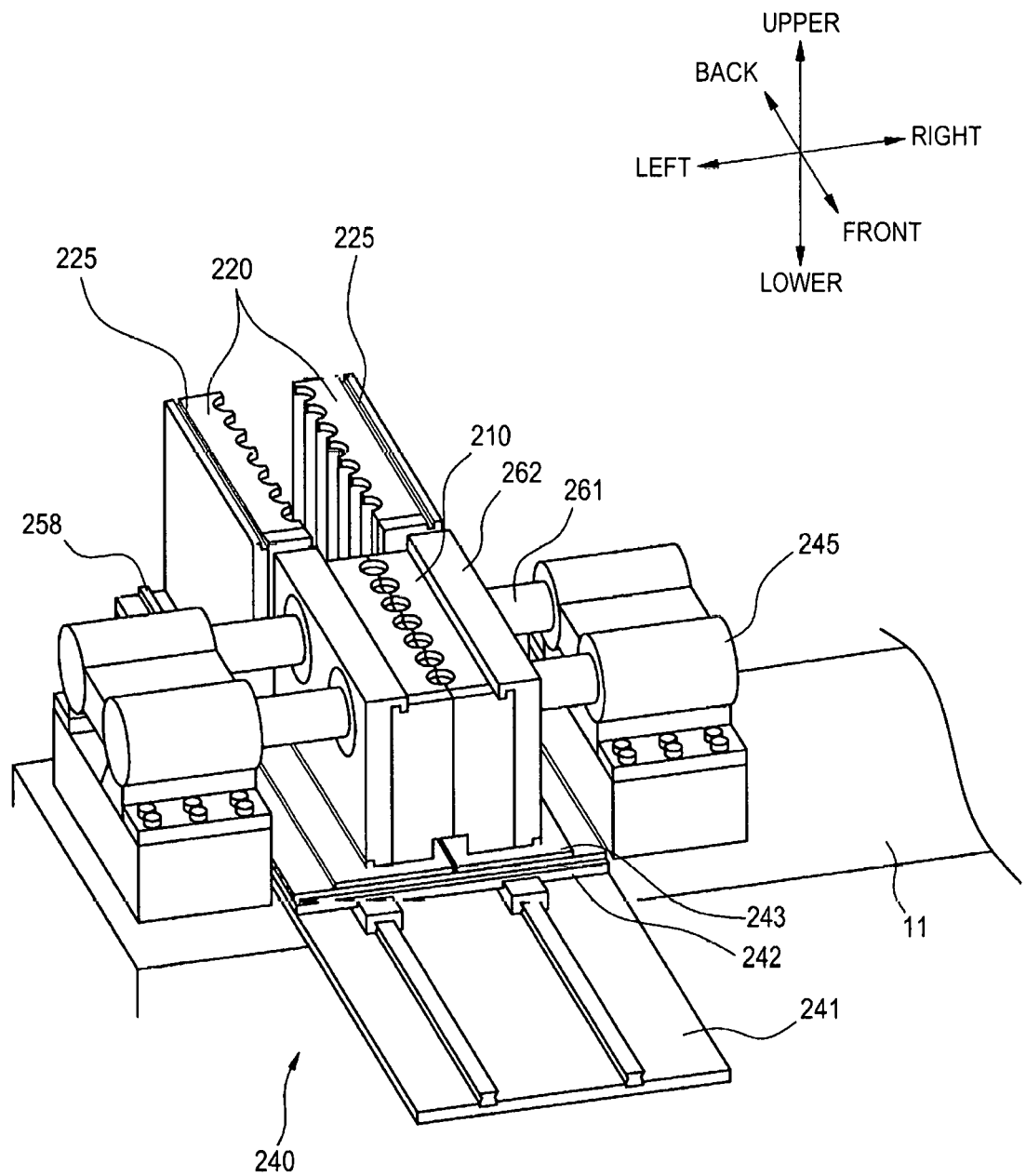
FIG. 2 is a perspective view illustrating a configuration of a blow molding unit.

As shown in FIGS. 1 and 2, the blow molding unit 20 includes a first mold unit 210 (an example of the first mold) and a second mold unit 220 (an example of the second mold) configured by split molds, and a movement unit 240 capable of moving the first mold unit and the second mold unit, and is provided below the support part 270 configured to support the preform, the intermediate molded article and the like. Meanwhile, in the example, the support part 270 is configured by a neck mold.

As shown in FIG. 3(*a*), in the first mold unit 210, a plurality of (six, in the example) first mold parts 211 for subjecting the preform to heat-set blowing to blow-mold an intermediate molded article. The heat-set blowing means primary blowing accompanied by heat setting. As shown in FIG. 3(*b*), in the second mold unit 220, a plurality of (six, in the example) second mold parts 221 for subjecting an intermediate molded article 6 to final blowing to blow-mold a container. The final blowing means secondary blowing accompanied by annealing and shaping processing into a final container shape.

The first mold part 211 has a first space 212 defined by a first inner wall surface 213, and the preform 5 supported by the support part 270 is disposed in the first space 212. The second mold part 221 has a second space 222 defined by a second inner wall surface 223, and the intermediate molded article 6 supported by the support part 270 is disposed in the second space 222. A size of the first space 212 of the first mold part 211 is formed to have a volume (size) greater than or substantially equivalent to the second space 222 of the second mold part 221. The first inner wall surface 213 of the first mold part 211 is configured as a wall surface having minor unevenness, and the second inner wall surface 223 of the second mold part 221 is configured as a wall surface having an unevenness for forming an outer peripheral wall of the container.

The first mold unit 210 and the second mold unit 220 are provided with a heating device or a temperature adjustment device, which are not shown, and are configured to temperature-adjust the first mold part 211 and the second mold part 221, respectively. The first inner wall surface 213 of the first mold part 211 is temperature-adjusted to a first temperature (for example, 170° C. to 190° C.) for subjecting the preform 5 to the heat-set blowing. The second inner wall surface 223 of the second mold part 221 is temperature-adjusted to a second temperature (for example, 110° C. to 120° C.) for subjecting the intermediate molded article 6 to the final blowing. The first temperature is set to a temperature slightly higher than a temperature (for example, 130° C. to 140° C.) at which crystallization of a resin material (for example, polyethylene terephthalate) of the container to be manufactured is promoted, considering easiness of resin stretching and lowering in temperature due to contact with the inner wall surface of the mold, and the second temperature is set to a temperature lower than the first temperature.

The first mold unit 210 is coupled with a bottom mold 214 for the first mold part 211 at a lower part of an inner surface of one of a pair of first split mold fixing plates 211a, and the second mold unit 220 is coupled with a bottom mold 224 for the second mold part 221 at a lower part of an inner surface of one of a pair of second split mold fixing plates 221a. The bottom mold 214 is configured to move up and down relative to the first mold part 211, and the bottom mold 224 is configured to move up and down relative to the second mold part 221. In the meantime, as described later, since the bottom molds 214, 224 is slid integrally with the first split mold fixing plates 211a or the second split mold fixing plates 221a when the first mold unit 210 and the second mold unit 220 are in an opened state, the bottom molds is not capable of being fixed in a usual state to an elevation device 280 (an elevation rod) of the blow molding device 1 that moves up and down the bottom molds 214, 224. Therefore, lower surfaces of the bottom molds 214, 224 (or the bottom mold fixing plates 214c, 224c having integrated the bottom molds) are provided with a mechanism (a coupling mechanism) that is capable of being coupled to the elevation device 280 only when the first mold unit 210 and the second mold unit 220 are in a closed state. The coupling mechanism is configured by a shaft part 214a and a coupling block 214b hanging down from the bottom mold 214. Also, the coupling mechanism is configured by a shaft part 224a and a coupling block 224b hanging down from the bottom mold 224.

Figure 4:
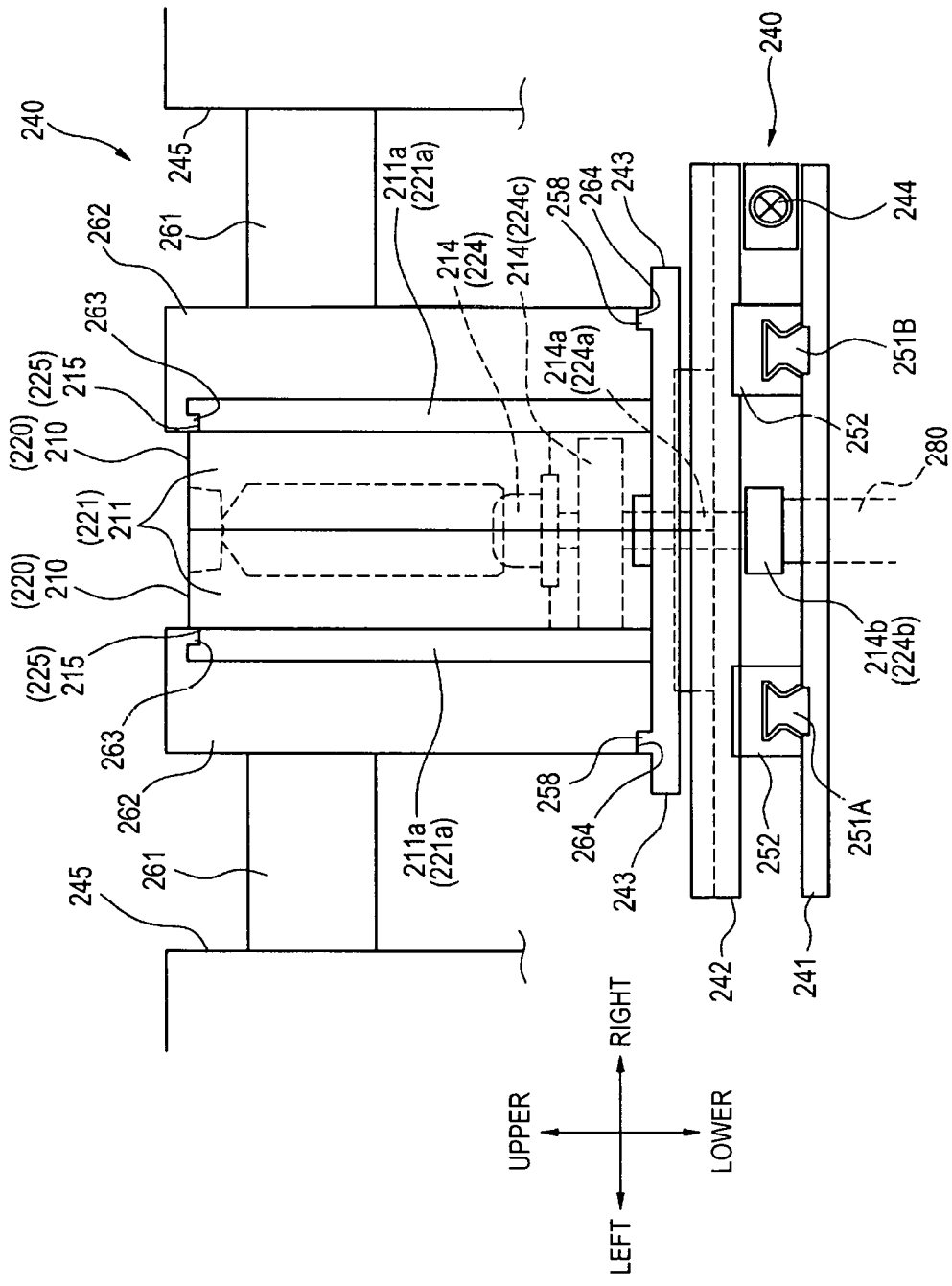
FIG. 4 depicts the blow molding unit of FIG. 2, as seen from the front.

As shown in FIG. 4, the movement unit 240 includes a fixed part 241 arranged at a bottom, a first moveable part 242 arranged above the fixed part 241, and a second moveable part 243 arranged above the first moveable part. Also, the movement unit 240 includes at least one motor (a first drive mechanism, a blow mold sliding mechanism) 244 for moving the first moveable part 242 and a pair of hydraulic cylinders (a second drive mechanism, one mold opening and closing mechanism (one mold clamping mechanism)) 245 for moving the second moveable part 243.

Figure 5:
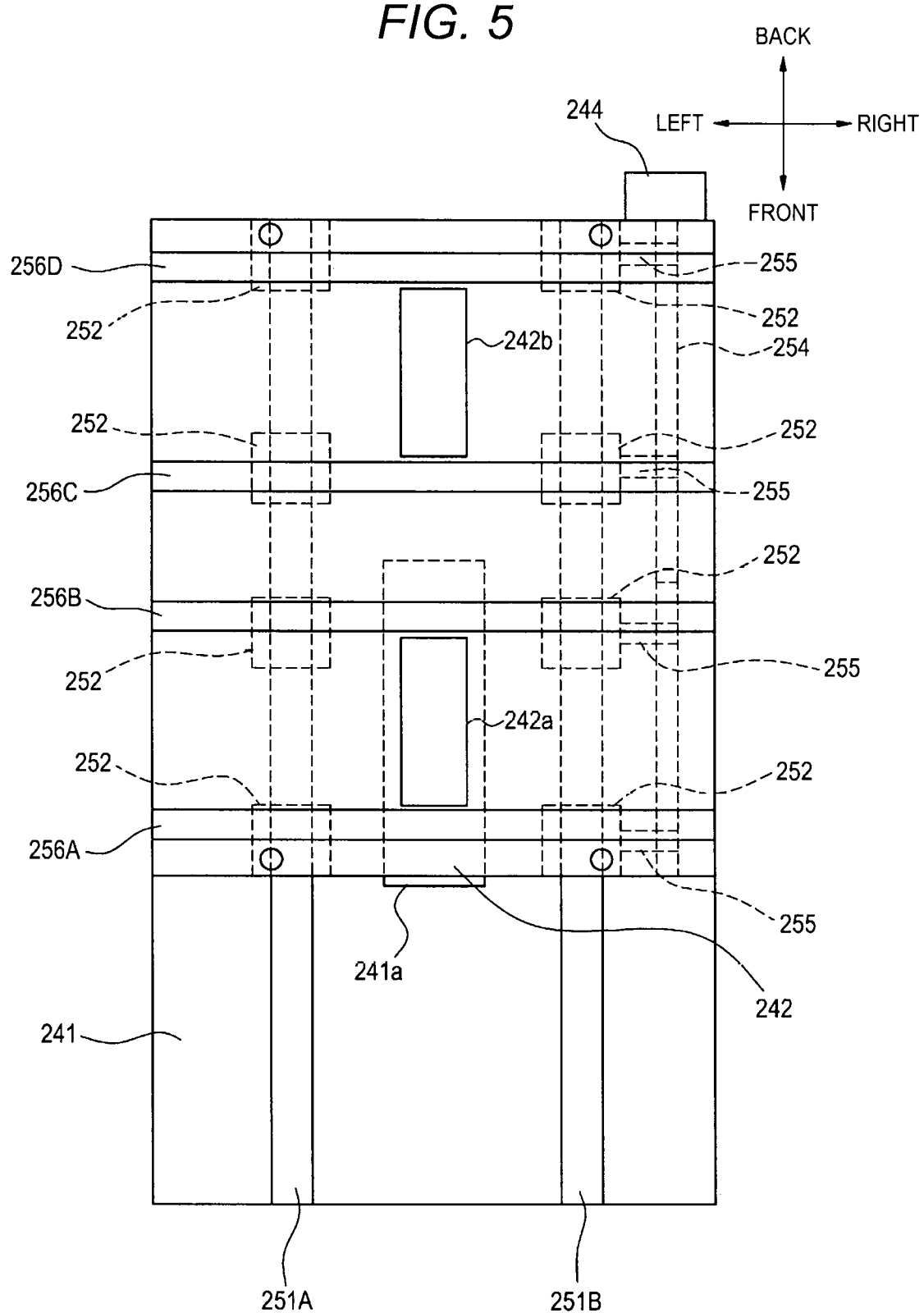
FIG. 5 illustrates a fixed part and a first moveable part configuring the blow molding unit.

FIG. 5 depicts the fixed part 241 and the first moveable part 242 of the movement unit 240. The fixed part 241 is configured by a long plate-shaped member. An upper surface of fixed part 241 is provided with two guide rails 251A, 251B extending in parallel with each other in a longitudinal direction (the front and back direction) of the fixed part 241. The guide rails 251A, 251B are respectively attached with a plurality of (four, in the example) blocks 252 so as to be moveable along the guide rails 251A, 251B. Also, a central position of the fixed part 241 in the longitudinal direction (the front and back direction) is formed with a through-hole 241a. A leading end of the elevation device 280 protrudes to be coupled to the coupling mechanism of the bottom molds 214, 224, beyond a top of the through-hole 241a. In the meantime, the guide rails 251A, 251B may be configured to function as the fixed part 241 by directly attaching the same to the upper surface of the base 11.

The first moveable part 242 is configured by a long plate-shaped member of which a length in the front and back direction is shorter than the fixed part 241, and a lower surface thereof is fixed to upper parts of the respective blocks 252. The first moveable part 242 is configured to move along the guide rails 251A, 251B together with the blocks 252 in accordance with movement of the blocks 252.

The motor 244 is coupled with a rod-shaped shaft part 254 disposed along the guide rail 251B, for example. The shaft part 254 is configured to rotate in accordance with rotation of the motor 244. The shaft part 254 is attached with coupling parts 255, so that the coupling pans 255 moves along the shaft part 254 in accordance with rotation of the shaft part 254. The coupling parts 255 are coupled to the blocks 252 of the guide rail 251B, so that the blocks 252 and the first moveable part 242 moves along the guide rail 251B in accordance with movement of the coupling parts 255. In the meantime, the coupling parts 255 may be coupled to the first moveable part 242.

Also, an upper surface of the first moveable part 242 is provided with guide grooves 256A to 256D (which will be described later) for enabling movement of the second moveable part 243.

Figure 6:
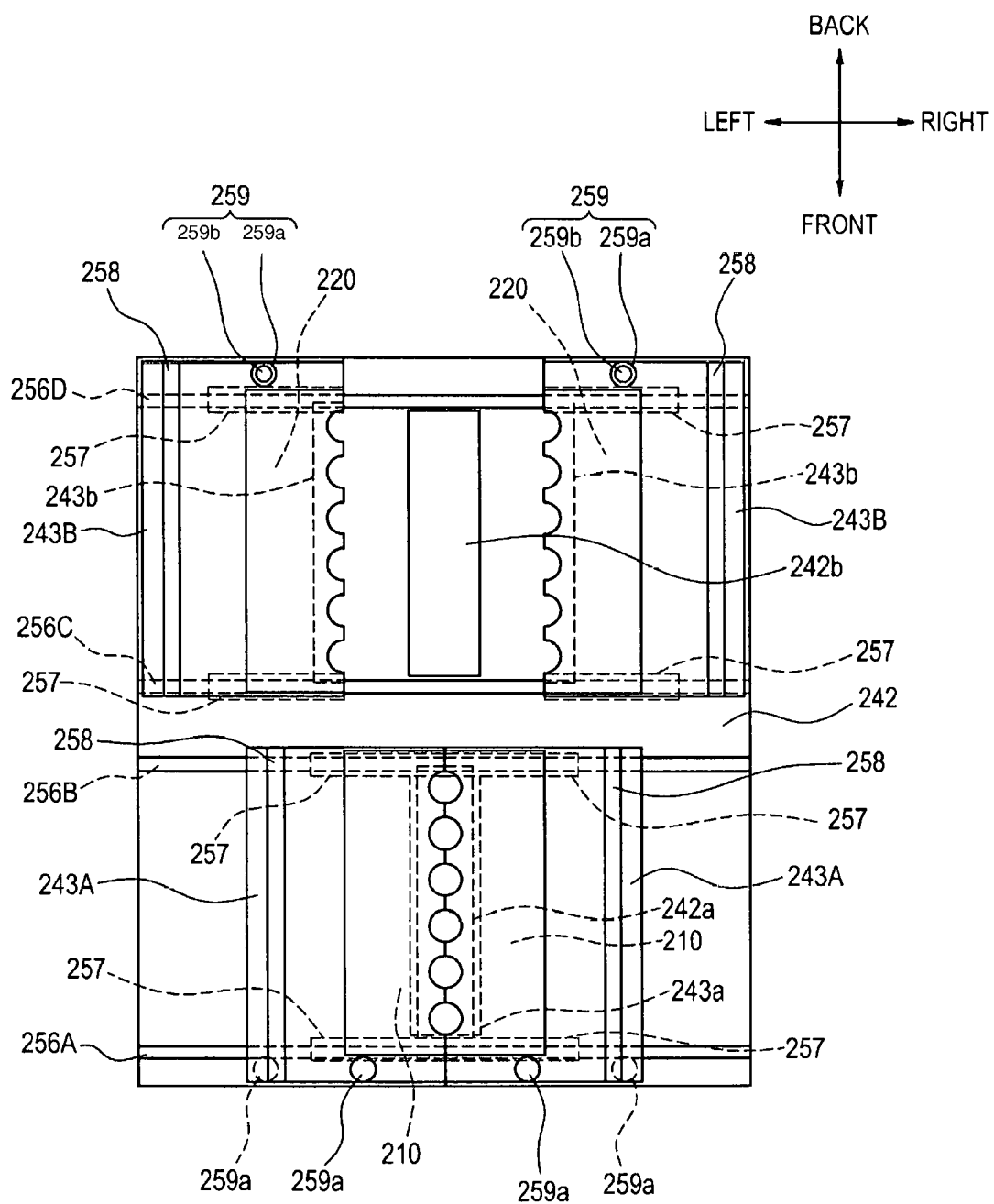
FIG. 6 illustrates the first moveable part and a second moveable part configuring the blow molding unit.
Figure 7:
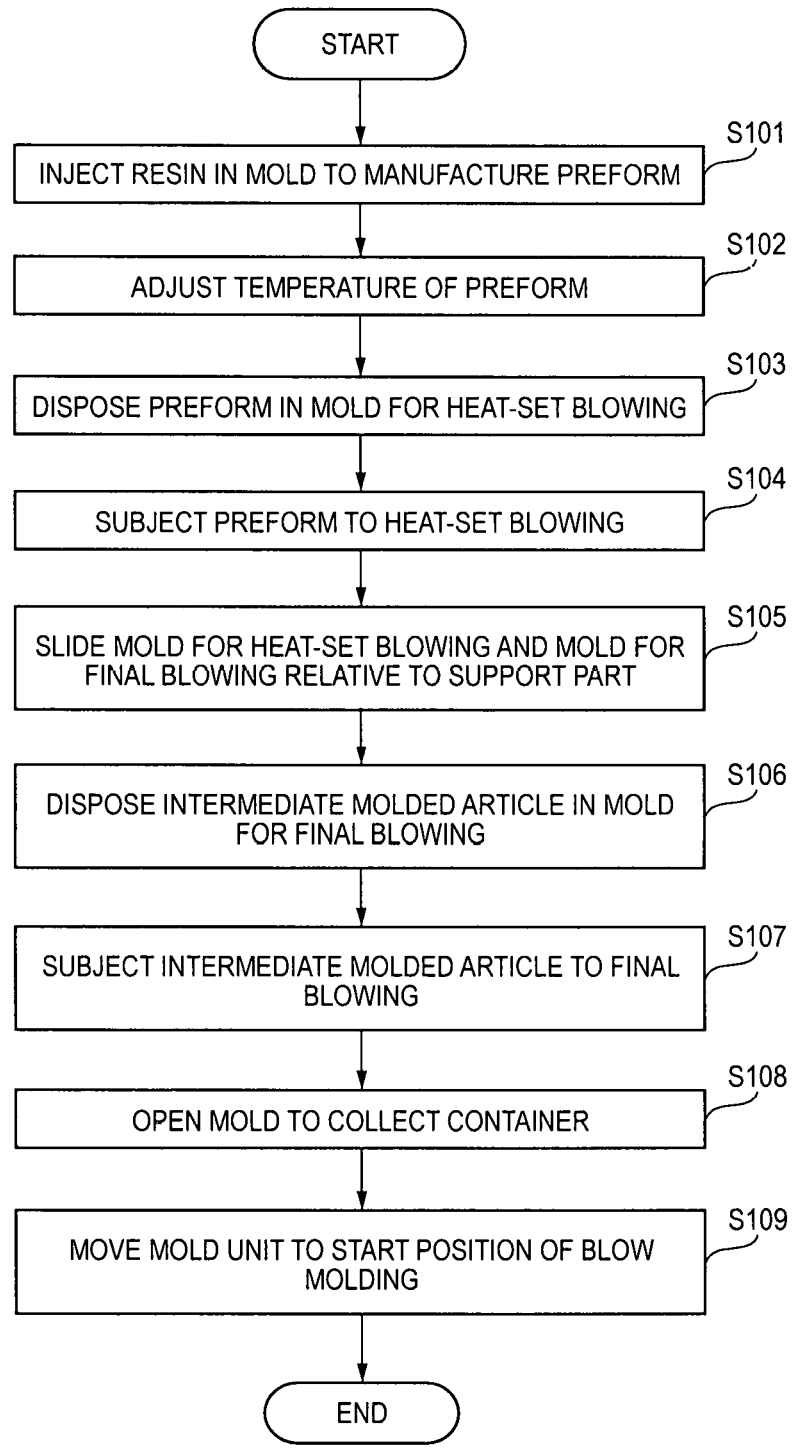
FIG. 7 is a flowchart of a blow molding method of the present invention.

FIG. 6 depicts the first moveable part 242 and the second moveable parts 243A, 243B of the movement unit 240. The guide grooves 256A to 256D of the first moveable part 242 are provided to extend in a direction (the right and left direction) perpendicularly intersecting with the direction of the guide rails 251A, 251B of the fixed part 241. The guide grooves 256A to 256D are respectively attached with a plurality of (two, in the example) blocks 257 so as to be moveable along the guide grooves 256A to 256D.

Also, the first moveable part 242 is formed with through-holes 242a, 242b at parts corresponding to the parts on which the second moveable parts 243A, 243B are placed, so that the bottom molds 214, 224 and the elevation device 280 can be coupled. When the bottom molds 214, 224 and the elevation device 280 are in a non-coupling state, the leading end of the elevation device 280 is retreated below the through-holes 242a, 242b, so that the first moveable part 242 (the mold units 210, 220) is slidable. In the meantime, a lower end of the coupling mechanism of the bottom molds 214, 224 in the non-coupling state may be arranged above the through-holes 242a, 242b, or may protrude below the through-holes 242a, 242b and may be arranged at a position higher than the fixed part 241.

The second moveable parts 243A, 243B are respectively configured by a pair of plate-shaped members that are split in the right and left direction, and lower surfaces thereof are fixed to upper parts of the blocks 257. The pair of second moveable parts 243A is respectively arranged over the guide grooves 256A, 256B, and is fixed to the blocks 257 attached to the guide grooves 256A, 256B. Likewise, the second moveable parts 243B are respectively fixed to the blocks 257 attached to the guide grooves 256C, 256D. The second moveable parts 243A are respectively configured to independently move along the guide grooves 256A, 256B together with the blocks 257, in accordance with movement of the blocks 257 to which the second moveable parts are fixed. Likewise, the second moveable parts 243B are respectively configured to independently move along the guide grooves 256C, 256D, together with the blocks 257 to which the second moveable parts are fixed. In the above example, the guide grooves 256A to 256D and the blocks 257 are provided. However, for example, the guide rails and the blocks shown in FIG. 5 may be provided.

Also, upper surfaces of the second moveable parts 243A, 2438 are respectively formed with one convex part 258 capable of being engaged with a cylinder plate (a mold opening and closing plate) 262 of the hydraulic cylinder 245, for example. The convex part 258 extends in the same direction as the extension direction of the guide rails 251A, 251B of the fixed part 241.

Also, the first moveable part 242 and the second moveable parts 243A, 243B are provided with positioning means 259 for fixing each of positions of the second moveable parts 243A, 243B relative to the first moveable part 242 to predetermined mold opening positions. The second moveable parts 243A, 243B are fixed to predetermined positions relative to the first moveable part 242 by matching holes 259a formed in the second moveable parts 243A, 243B and the holes 259a formed in the first moveable part 242 and inserting positioning pins 259b into the holes from above, for example. Also, by the positioning means 259, when sliding the first moveable part 242, the mold units 210, 220 are always set to a fixed state at the predetermined mold opening positions, and the fixed state is always released before moving the second moveable part 243 in a mold opening and closing direction.

Each split mold of the first mold unit 210 is fixed on the pair of second moveable parts 243A, and each split mold of the second mold unit 220 is fixed on the pair of second moveable parts 243B. In the meantime, when the first mold unit 210 or the second mold unit 220 is in a mold-closed state, a gap (through-hole) 243a (243b) is formed between the pair of second moveable parts 243A (243B). The coupling mechanism of the bottom molds 214, 224 is coupled to the elevation device 280 protruding from the through-hole 241a of the fixed plate 241, via the gap (through-hole) 243a of the second moveable parts 243A (243B) and the through-hole 242a (242b) of the first moveable part 242.

The hydraulic cylinder 245 includes a cylinder rod (an extension and contraction mechanism) 261 extends and contracts in accordance with movement of a piston, and a cylinder plate (a mold opening and closing plate) 262 attached to a leading end portion of the cylinder rod 261 (refer to FIGS. 2 and 4). The pair of hydraulic cylinders 245 is arranged so that the cylinder plates 262 face each other at both right and left sides of a central part of the fixed part 241 in the longitudinal direction (the front and back direction). The cylinder plate 262 is formed with a convex part 263 for engaging with a concave part 215 formed at the first mold unit 210 or a concave part 225 formed at the second mold unit 220. Also, the cylinder plate 262 is provided with a concave part 264 for engaging with a convex part 258 of each of the second moveable parts 243A, 243B. The convex part 263 and the concave part 264 extend in the same direction as the extension direction of the guide rails 251A, 251B of the fixed part 241. In the meantime, the concave part 215 of the first mold unit 210 and the concave part 225 of the second mold unit 220 also extend in the same direction as the extension direction of the guide rails 251A, 251B of the fixed part 241.

The hydraulic cylinder 245 causes the cylinder plate 262 to engage with each of the parts, so that the cylinder plate 262 is in contact with a back surface of the first mold unit 210 or the second mold unit 220. The hydraulic cylinder 245 pushes and pulls the first mold unit 210 or the second mold unit 220 and controls a position thereof by extending and contracting the cylinder rod 261, thereby pushing and pulling the first mold unit 210 or the second mold unit 220 to.

A blow core mold (not shown) is provided above the support part 270. The blow core mold is fitted to a mouth part of the preform 5 or the intermediate molded article 6 supported by the support part 270. The preform 5 is blow-molded into the intermediate molded article 6 by introducing blow air into the preform 5 in the first mold unit 210. The intermediate molded article 6 is blow-molded into a container by introducing the blow air into the intermediate molded article 6 in the second mold unit 220. Also, a stretching rod configured to adjust a stroke of a rod is mounted above the support part 270. The support part 270 moves up and down, for example, and takes a plurality of (six, in the example) preforms 5 in and out the first mold unit 210 that is in a state where the split molds are opened, and takes a plurality of (six, in the example) intermediate molded articles 6 in and out the second mold unit 220. That is, the blow core mold and the stretching rod are commonly used in the first mold unit 210 (the heat-set blowing) and the second mold unit 220 (the final blowing).

The blow molding unit 20 has the configuration as described above, i.e., the configuration where the first moveable part 242 is slid by the motor (the first drive mechanism) 244, so that the first mold unit 210 having a heat-set blowing mold and the second mold unit 220 having a final blowing mold are capable of being caused to alternately enter between the pair of hydraulic cylinders (the second drive mechanism, the mold opening and closing mechanism) 245. In this way, the first mold unit 210 and the second mold unit 220 are caused to move relative to the support part 270, so that it is possible to continuously execute the heat-set blowing and the final blowing. The description "relative" movement is not limited to the example where the first mold unit 210 and the second mold unit 220 arranged on the fixed part 241 are moved at the same time by sliding the first moveable part 242 extending in the extension direction of the guide rails 251A, 251B relative to the support part 270 that supports the preform 5 or the intermediate molded article 6. For example, a configuration where the support part 270 is moved in the front and back direction relative to the first mold unit 210 and the second mold unit 220 is also included. Also, as described above, the blow molding unit 20 is configured to sequentially advance and retreat the first mold unit 210 and the second mold unit 220, which are arranged in the non-coupling state with the pair of cylinder plates (the mold opening and closing plates) 262 therebetween, by the movement unit 240. That is, it is possible to implement the mold opening and closing and the mold clamping of the two mold units 210, 220 by one mold opening and closing mechanism 245, and to perform continuously the double blowing (continuous blowing step) consisting of the heat-set blowing and the final blowing for the preform 5 supported by the support member 270 at the same position.

Subsequently, a blow molding method is described with reference to FIGS. 7 to 12.

First, in the injection molding unit 10, the six preforms 5 are manufactured by injecting resin from the injection device 12 into a space formed by the mold closing (step S101).

Then, each preform 5 is conveyed to the temperature adjustment unit 15 by the conveying unit 30. In the temperature adjustment unit 15, temperature adjustment is performed so that the entire preform 5 has a uniform temperature distribution and becomes close to a temperature suitable for stretching blowing (step S102).

In the blow molding unit 20, the first moveable part 242 is slid along the guide rails 251A, 251B, so that the first mold unit 210 is made to stand by at a position at which the preform 5 is subjected to the heat-set blowing. At this time, both the first mold unit 210 and the second mold unit 220 are in a state where the split molds thereof are opened. The second moveable part 243B on which the second mold unit 220 is arranged is fixed at a predetermined mold opening position by the positioning means 259. The second moveable part 243A on which the first mold unit 210 is arranged is released from a fixed state due to the positioning means 259 and is moveable along the guide grooves 256A, 256B. Also, the cylinder plate 262 of the hydraulic cylinder 245 is in a state where the convex part 263 is engaged with the concave part 215 of the first mold unit 210 and the concave part 264 is engaged with the convex part 258 of the second moveable part 243A (refer to a101 and b101 of FIG. 8). After the first mold unit 210 is made to stand by at a position at which the heat-set blowing is to be performed, the elevation device (elevation rod) 280 coupled to the bottom mold 214 is moved up from the standby position that is a lower portion to the above coupling position that is an upper portion. In the meantime, the elevation device 280 is fixed to one side of a blow molding machine so as to be moveable up and down.

Figure 8:
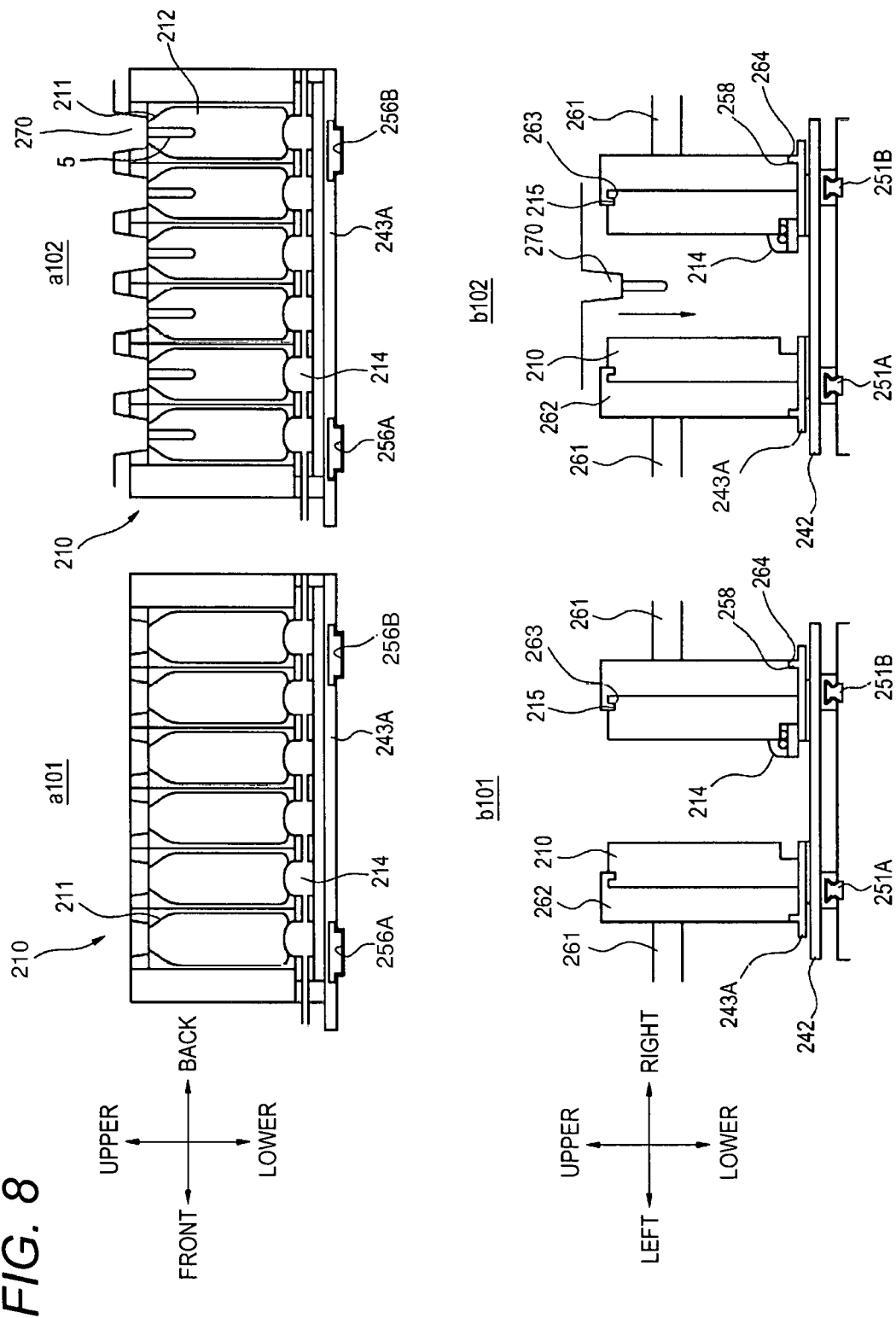
FIG. 8 depicts each step from a standby state of a first mold unit to arrangement of a preform in the blow molding method.

Subsequently, the support part 270 that supports each preform 5 is moved to dispose each of the temperature-adjusted preforms 5 in the first space 212 of each of the first mold parts 211 provided to the first mold unit 210 (step S103, refer to a102 and b102 of FIG. 8).

Then, the cylinder rods 261 of the hydraulic cylinders 245 are extended to move the second moveable part 243A along the guide grooves 256A, 256B, so that the first mold unit 210 is mold-closed, and the elevation device 280 and the bottom mold 214 of the machine-side are coupled. Thereafter, the bottom mold 214 is further moved up and is contacted to the first mold part 211, so that the first space 212 for the intermediate molded article 6 is formed. At this time, by the heating device, the first inner wall surface 213 of the first mold part 211 is temperature-adjusted to the first temperature (for example, 170° C.) and the bottom mold 214 is temperature-adjusted to 100° C., for example. Then, the blow air is introduced from the blow core mold into the preform 5, the stretching rod is extended in conformity to a longitudinal length of the first space 212, and the preform 5 is molded into the intermediate molded article 6 by the heat-set blowing in the first mold part 211 (step S104, refer to a103 and b103 of FIG. 9).

Subsequently, after the bottom mold 214 is moved down to release the contact with the first mold part 211, the cylinder rods 261 are contracted and moves the second moveable part 243A along the guide grooves 256A, 256B in an opposite direction to the processing of b103, thereby mold-opening the first mold unit 210 having performed the heat-set blowing (refer to a104 and b104 of FIG. 9). Simultaneously with the mold opening, the bottom mold 241 and the elevation device 280 are decoupled at the coupling position, and the elevation device 280 is then moved down and returned to the standby position. Also, the position of the first mold unit 210 (the second moveable part 243A) is fixed by the positioning means 259 so that it is stopped at the mold-opened position. A size of each intermediate molded article 6 immediately after the heat-set blowing in the first mold part 211 is formed to have a volume (size) larger than or substantially equivalent to the second space 222 of the second mold part 221. The first mold unit 210 is mold-opened, so that each intermediate molded article 6 released from the first mold part 211 is reduced and deformed into a size equivalent to or smaller than the second space 222 of the second mold part 221.

Figure 10:
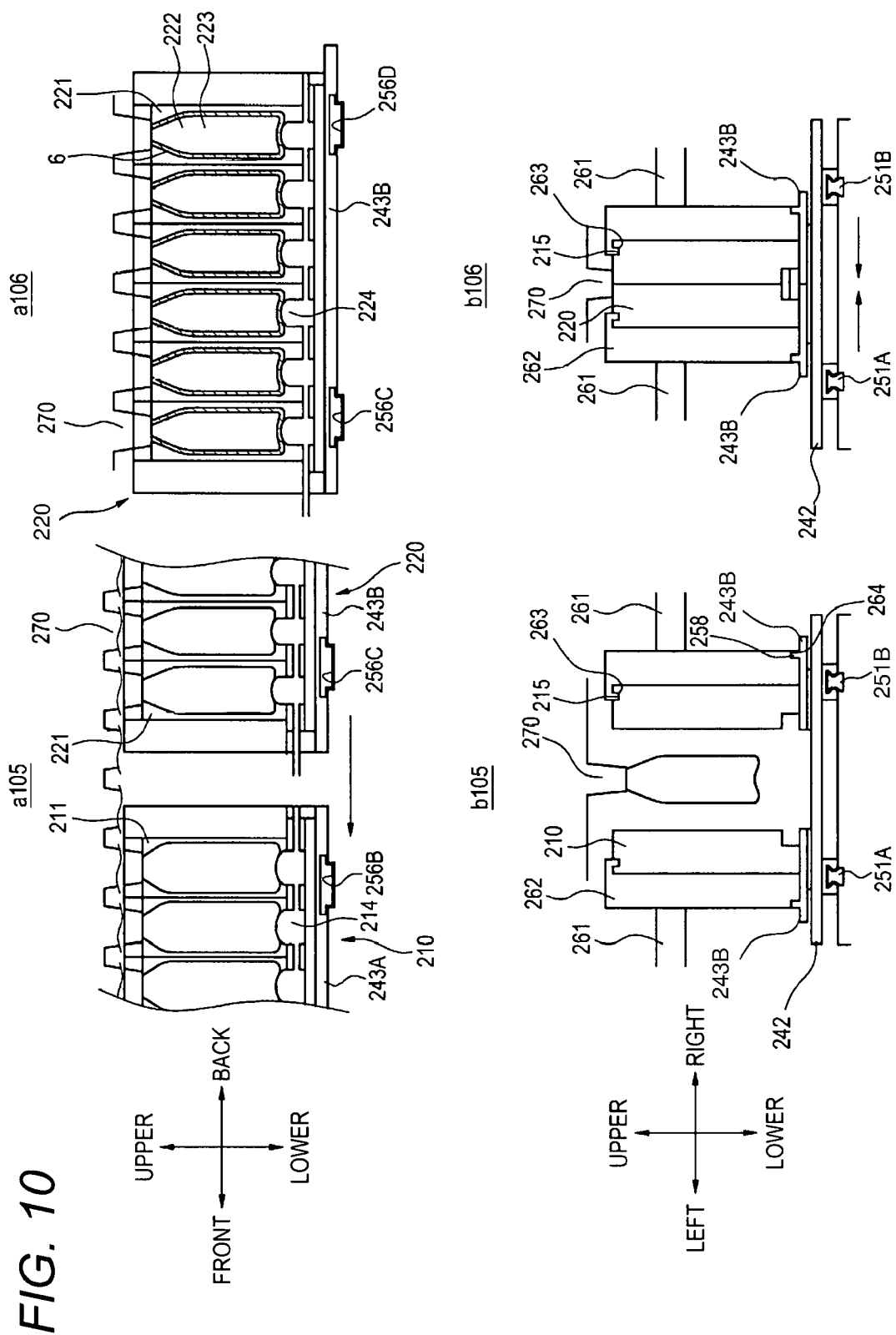
FIG. 10 depicts each step from movement of the mold unit to mold clamping of final blow in the blow molding method.

Subsequently, the first moveable part 242 is slid along the guide rails 251A, 251B by the motor 244, so that the second mold unit 220 is located at a position at which each intermediate molded article 6 is to be subjected to the final blowing (step S105, refer to a105 and b105 of FIG. 10). In this case, the position of the support part 270 is not changed, so that the position (refer to a102 and b102 of FIG. 8) of the support part 270 that supports each preform 5 and the position (refer to a105 and b105 of FIG. 10) of the support part 270 that supports each intermediate molded article 6 are kept at the same positions. The first mold unit 210 and the second mold unit 220 are moved relative to the support part 270 kept at the same position along the extension direction of the guide rails 251A, 251B so as to perform the final blowing continuously to the heat-set blowing. In the example, the description "performing the blowing continuously" means that the final blowing is performed with a small blowing interval (for example, within 5 to 10 seconds) so as not to largely reduce a temperature of the intermediate molded article 6 subjected to the heat-set blowing in the first mold unit 210 to a level of a room temperature, for example.

The first moveable part 242 is slid, so that the engagement between the concave part 215 of the first mold unit 210 and the convex part 263 of the cylinder plate 262 is released, and the engagement between the convex part 258 of the second moveable part 243A and the concave part 264 of the cylinder plate 262 is released. Then, the concave part 225 of the second mold unit 220 is engaged with the convex part 263 of the cylinder plate 262 and the convex part 258 of the second moveable part 243B is engaged with the concave part 264 of the cylinder plate 262. In the meantime, before the second mold unit 220 reaches a position of the final blowing, the elevation device 280 is moved up from the standby position that is a lower portion to the coupling position that is an upper portion.

Subsequently, the fixed state of the second mold unit 220 by the positioning means 259 is released and the cylinder rods 261 are extended, so that the second moveable part 243H is moved along the guide grooves 256C, 256D so as to mold-close the second mold unit 220 and so as to couple the bottom mold 224 and the elevation device 280. Then, the bottom mold is moved up and contacted to the second mold part 221, so that each intermediate molded article 6 is accommodated in the second space 222 of the second mold part 221 (step S106, refer to a106 and b106 of FIG. 10). At this time, by the temperature adjustment device, the second inner wall surface 223 of the second mold part 221 is temperature-adjusted to the second temperature (for example, 120° C.) and the bottom mold 224 is temperature-regulated to 100° C., for example.

Figure 11:
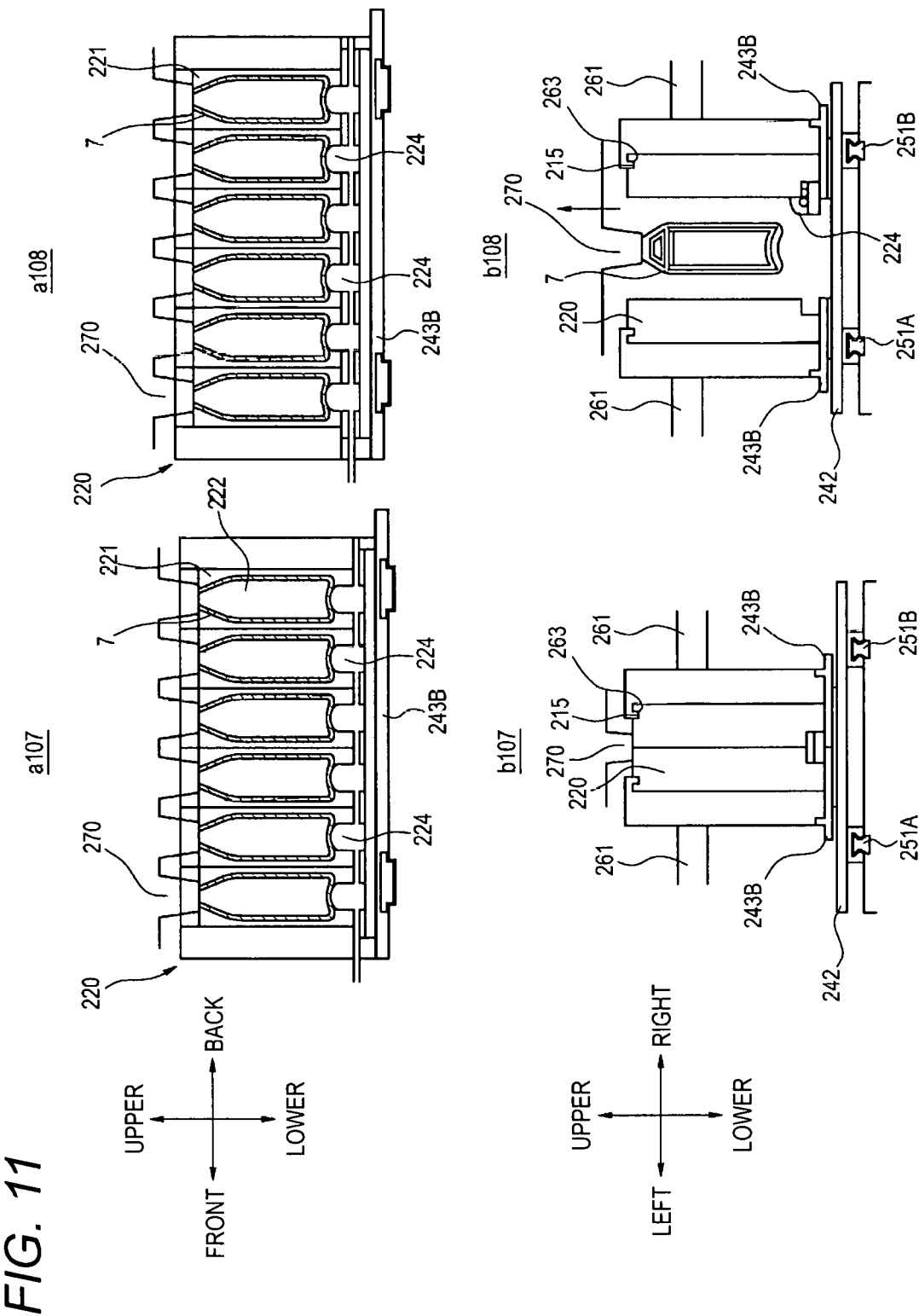
FIG. 11 depicts each step from final blow molding to the mold opening in the blow molding method.

Subsequently, the blow air is introduced from the blow core mold into the intermediate molded article 6 and the stretching rod is extended in conformity to the longitudinal length of the second space 222, so that the six intermediate molded articles 6 in the second mold parts 221 are finally blown into six containers 7 (step S107, refer to a107 and b107 of FIG. 11).

Subsequently, the bottom mold 224 is moved down to release the contact with the second mold unit 220, and the second mold unit 220 having performed the final blowing is mold-opened (refer to a108 and b108 of FIG. 11). At the same time, the bottom mold 224 and the elevation device 280 are decoupled and the elevation device 280 is moved down. The second mold unit 220 is mold-opened, so that the container 7 is demolded from the second mold part 221. The support part 270 is moved up, so that each container 7 supported to the support part 270 is collected (step S108).

Figure 12:
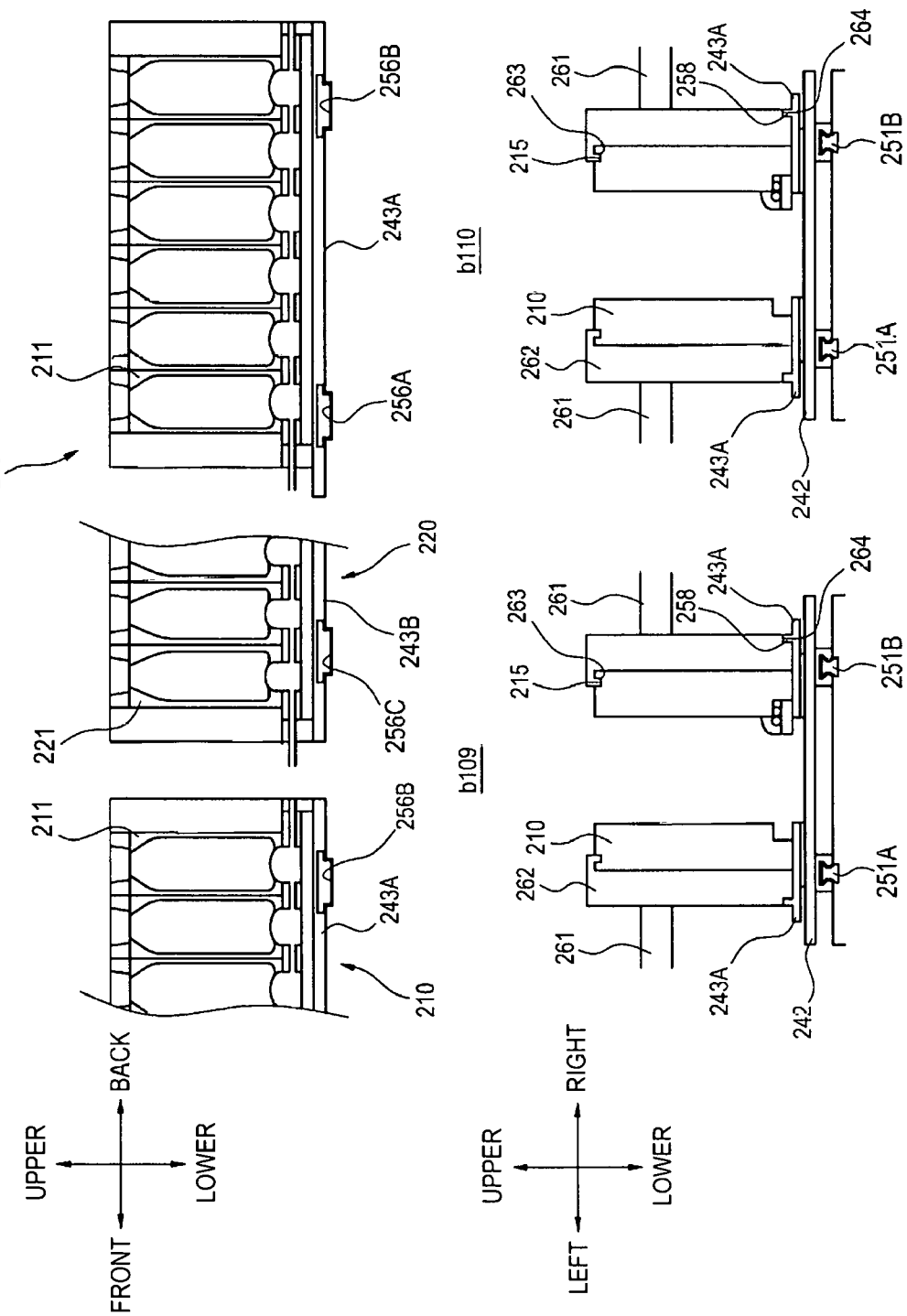
FIG. 12 depicts each step from movement of the mold unit to blow-molding completion in the blow molding method.

Subsequently, after the second mold unit 220 is set to the fixed state by the positioning means 259, the first moveable part 242 is slid along the guide rails 251A, 251B by the motor 244 (refer to a109 and b109 of FIG. 12) and is returned to the start state of the blow molding in which the first mold unit 210 is located at the position at which the preform 5 is to be subjected to the heat-set blowing (step S109, refer to a110 and b110 of FIG. 12).

In the method referred to as 1-stage/1-blow method in which both the heat-set blowing and the final blowing are performed to perform the blowing for the preform only once and to finally mold a container, it is not possible to set the blowing mold to high temperatures, considering sticking to the mold (for example, the blowing could be performed only at about 130° C.). As a result, a crystallization density of a PET bottle manufactured by the 1-stage/1-blow method is not very high, as compared to a PET bottle manufactured by the 2-stage/2-blow method. Also, the strain (residual stress) of the PET bottle generated upon the blow molding is increased.

On the other hand, according to a device of the 2-stage/2-blow method, it is possible to manufacture a PET bottle having high resistance. However, since it is necessary to naturally cool the preform and then to heat the same to a temperature suitable for the blowing in the heating part, the energy efficiency is lowered. Also, according to the 2-stage/2-blow method, the device becomes enlarged and the wide equipment space is also required. For example, it is necessary to provide the two mold clamping mechanisms and blowing mechanisms.

In contrast, according to the blow molding device 1 and the blow molding method of the illustrative embodiment, the 1-stage/2-blow method in which after injection-molding the preform 5, the heat-set blowing of the preform 5 and the final blowing of the intermediate molded article 6 are separately continuously performed is adopted. For this reason, since the preform 5 manufactured in the injection molding unit 10 is subjected to the heat-set blowing without being cooled to the room temperature, the energy for reheating the preform 5 to the temperature suitable for blowing is not required, so that it is possible to improve the energy efficiency.

Also, according to the 1-stage/2-blow method of the example, it is possible to reduce a size of the blow molding device 1, to save equipment cost of the blow molding device 1 and to reduce equipment space, as compared to the 2-stage/2-blow method. For example, only one mold closing mechanism may be provided, and installation of the blow molding device 1 is performed just once. Also, it is possible to execute the injection molding, the heat-set blowing, and the final blowing in a short time and to repetitively execute the same.

Also, since the first mold unit 210 including the plurality of first mold parts 211 and the second mold unit 220 including the plurality of second mold parts 221 are separately provided, it is possible to execute the heat-set blowing step, independently of the final blowing step to be subsequently executed continuously. For this reason, it is possible to set the first temperature, which is used in the heat-set blowing, to a temperature higher than the second temperature (for example, 120° C.), which is used in the final blowing, for example, to a temperature (for example, 170° C.) at which crystallization of resin is promoted, so that it is possible to manufacture the container having sufficient heat resistance. In the meantime, the "sufficient" heat resistance means heat resistance at which the shrinkage deformation is little caused even when liquid of high temperature of about 90° C. or higher is filled for sterilization.

Also, the first mold unit 210 and the second mold unit 220 disposed above the fixed part 241 are slid at the same time along the guide rails 251A, 251B, so that it is possible to switch the mold unit from the first mold unit 210 in which the preform 5 is subjected to the heat-set blowing to the second mold unit 220 in which the intermediate molded article 6 is subjected to the final blowing. For this reason, it is possible to smoothly continuously execute the heat-set blowing step and the final blowing step, and it is not necessary to perform processing for avoiding lowering in temperature for the intermediate molded article 6, so that it is possible to improve the energy efficiency. Also, according to the above configuration, it is not necessary to particularly change a size of the neck mold (the neck mold fixing plate) that configures the support part 270 from the neck mold of the conventional device of 1-stage method, and it is possible to convey the substantially same number of the preforms as the conventional device. Therefore, it is possible to manufacture the bottles having higher heat resistance while maintaining the quantity of production equivalent to the 1-stage/1-blow method.

Also, the mechanical configuration for executing continuously the heat-set blowing step and the final blowing step can be simply implemented by the first moveable part 242 maveable in the longitudinal direction of the fixed part 241 and the second moveable part 243 maveable in the direction perpendicularly intersecting with the longitudinal direction.

Also, since the support part 270 upon supporting the preform 5 and the support part 270 upon supporting the intermediate molded article 6 are commonly used, the support part is kept at the same position. For this reason, it is possible to separately smoothly execute continuously the step of subjecting the preform 5 to the heat-step blowing at the first temperature and the step of blow-molding the intermediate molded article 6 at the second temperature to manufacture the container.

The first space 212 of the first mold part 211 is formed to have a size (volume) larger than or substantially equivalent to the second space 222 of the second mold part 221. For this reason, it is possible to make the first space 212 larger than the second space 222, to blow-mold the preform 5 to be temporarily larger than a size (volume) of the final container and to largely extend the same, considering shrinkage after the heat-set blowing. Thereby, it is possible to reduce residual stress (strain caused due to stretching orientation) remaining in the final formed article (container).

In the preform 5 immediately after being manufactured by the injection molding unit 10, there may be a deviation in the temperature distribution on the preform 5 due to an influence of heat upon the injection. In contrast, according to the above configuration, since the temperature adjustment processing is performed for the injection-molded preform 5 and the heat-set blowing is performed for the preform 5 after the temperature adjustment processing, it is possible to reduce the temperature deviation, which may be caused on the intermediate molded article 6 or the final container 7, so that the non-uniform thickness is difficult to be caused. Thereby, it is possible to obtain the more stable heat resistance.

Also, since the movement unit 240 is provided with the positioning means 259 for positioning the positions of the second moveable parts 243A, 243B relative to the first moveable part 242, it is possible to accurately position the second moveable parts 243A, 243B. More specifically, before and after the first moveable part 242 (the mold units 210, 220) is slid, it is possible to optimally keep the gaps between the cylinder plate (the mold opening and closing plate) 262 and the first mold part 211, and between the cylinder plate and the second mold part 221. For this reason, when sliding the first moveable part 242, an engagement problem between the mold unit and the cylinder plate, and between the second moveable part and the cylinder plate due to the positional deviation is difficult to occur.

Therefore, according to the above configuration, it is possible to provide the blow molding device 1 and the blow molding method capable of achieving improvements on both the energy efficiency and the heat resistance performance.

Also, according to the conventional device of 2-stage/1-blow method, it is possible to manufacture the PET bottle capable of enduring the high-temperature filling. However, since it is necessary to naturally cool the preform and then to heat the same to a temperature suitable for the blowing in the heating part, the energy efficiency is lowered. Also, the conventional device is a device suitable for mass production of few-kind bottles. Therefore, when large variety of bottles are to be manufactured by small lot production, the conventional device is likely to have the over-specification and does not satisfy the cost need.

Also, the heat resistance performance of the bottle manufactured by the 2-stage/1-blow method tends to be lowered as moisture in the air is absorbed. That is, when the manufactured bottle is stored or time elapses from the manufacturing, the heat resistance performance is remarkably deteriorated. A bottle manufacturer of a large enterprise can prepare a large-scale equipment, in which a blow molding machine and a filling apparatus for high-temperature contents are interconnected, in its company factory, and till high-temperature liquid in a bottle immediately after the manufacturing. That is, the above influence is relatively low because the contents can be filled with an in-line system. However, since a small to medium-sized bottle manufacturer just manufactures a bottle and the filling step is implemented at a delivery destination (customer), in many cases, it is not possible to ignore the influence of the lowering in heat resistance performance caused due to the absorption of moisture. The lowering in heat resistance performance caused due to the absorption of moisture can be mitigated by the technology of the double blow (2-stage/2-blow method) disclosed in Japanese Patent No. 5,503,748B. However, currently, there was no double blow-type molding machine for large variety and small lot production, which is suitable for the small to medium-sized bottle manufacturer.

However, according to the above configuration of the illustrative embodiment, it is possible to provide the blow molding device and the blow molding method, which are very suitable for large variety and small lot production and for the case where the high-temperature contents cannot be filled immediately after the bottle manufacturing.

In the meantime, the present invention is not limited to the illustrative embodiment and can be appropriately modified and improved. In addition, the materials, shapes, sizes, numerical values, forms, number, arrangement places and the like of the respective constitutional elements of the illustrative embodiment are optional and are not particularly limited inasmuch as the present invention can be implemented.

For example, in the example, the first mold parts 211 and the second mold parts 221 are respectively provided in the state where the six mold parts are aligned in one line. However, the present invention is not limited thereto.

Modified Embodiments

Subsequently, modified embodiments of the blow molding unit 20 are described.

Figure 13:
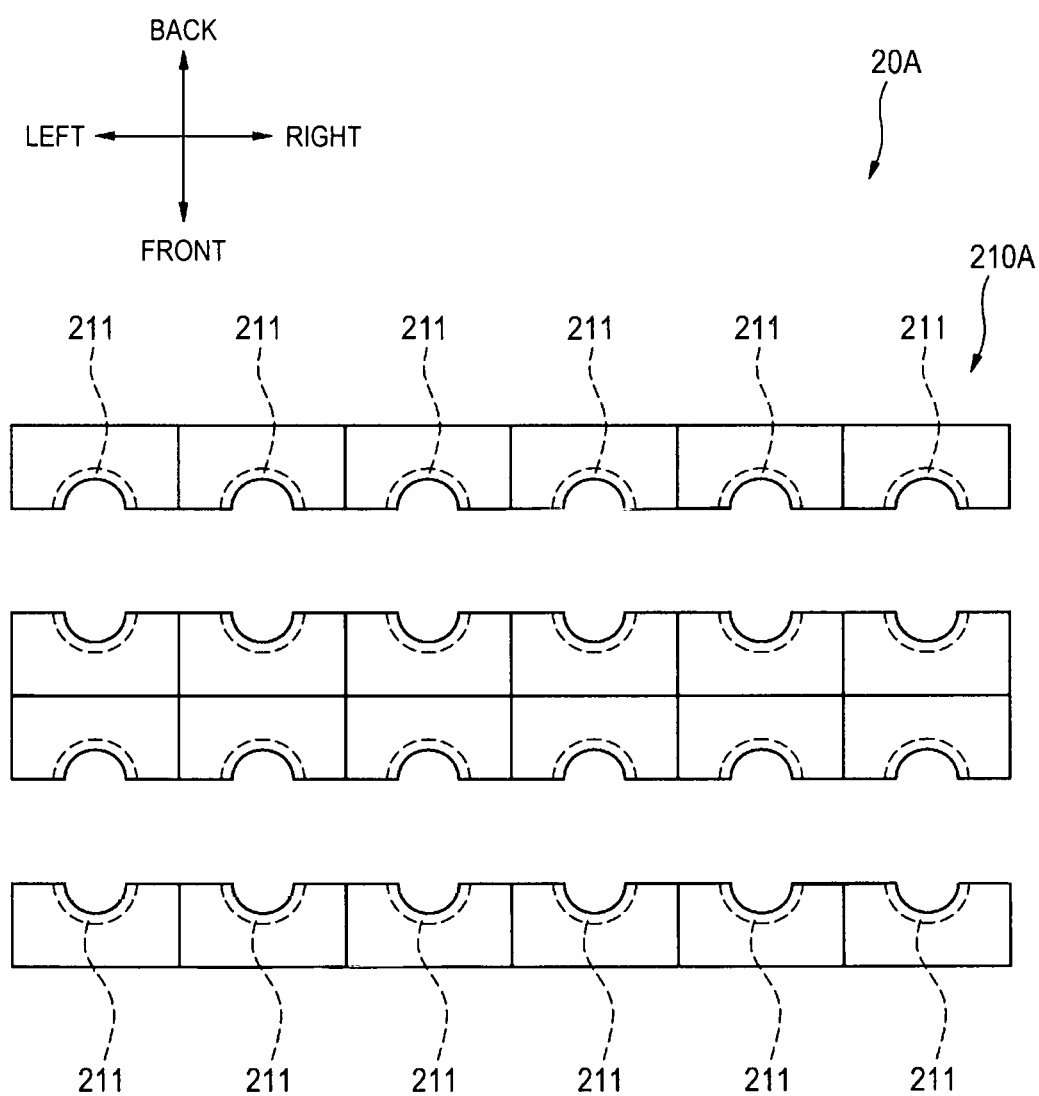
FIG. 13 depicts a modified embodiment of the blow molding unit.

As shown in FIG. 13, a blow molding unit 20A of a modified embodiment includes a first mold unit 210A that subjects the preform 5 to the heat-set blowing and that includes the first mold parts 211 aligned in the right and left direction by six and coupled in two rows in the front and back direction. Also, the second mold unit 220A (not shown) configured to subject the intermediate molded article 6 to the final blowing has a similar configuration. In this case, the support part 270 is also provided in parallel in two rows, and the first mold unit 210A and the second mold unit 220A arranged on the first moveable part moves relative to the support part 270 as the first moveable part is slid. In the meantime, the mold parts are not limited to the arrangement of two rows, and may be provided in three or more rows.

According to the above configuration, it is possible to provide the blow molding device and the blow molding method capable of achieving improvements on both the energy efficiency and the heat resistance performance and blow-molding many containers at one time.

Also, for example, in the example, the present invention is applied to the blow molding device and the blow molding method referred to as 1-stage method. However, the present invention is not limited thereto, and can be applied to a 1.5-stage method, too, for example.

Although the present invention has been described in detail with reference to the specific illustrative embodiment, it is obvious to one skilled in the art that a variety of changes and modifications can be made without departing from the spirit and scope of the present invention.

For example, a pneumatic drive source such as an air cylinder may be adopted instead of the motor 244, and an electric mold opening and closing mechanism including an electric motor, a toggle link mechanism and a mold opening and closing plate for toggle link may be adopted instead of the hydraulic cylinder 245, the cylinder rod 261 and the cylinder plate 262.

The subject application is based on Japanese Patent Application No. 2016-030471 filed on Feb. 19, 2016, the contents of which are incorporated herein by reference.

DESCRIPTION OF REFERENCE NUMERALS

1: blow molding device, 5: preform, 6: intermediate molded article, 7: container, 10: injection molding unit, 12: injection device, 15: temperature adjustment unit, 20: blow molding unit, 25: removing unit, 210: first mold unit, 211: first mold part, 215, 225: concave part, 220: second mold unit, 221: second mold part, 240: movement unit, 241: fixed part, 242: first moveable part, 243: second moveable part, 245: hydraulic cylinder, 251A, 251B: guide rail, 252: block, 256A to 256D: guide groove, 257: block, 258: convex part, 259: positioning means, 261: cylinder rod, 262: cylinder plate, 263: convex part, 264: concave part, 270: support part

The invention claimed is:
1. A blow molding device comprising:
 a base;
 an injection molding unit provided on the base and manufacturing a bottomed preform made of resin;
 a blow molding unit provided on the base;
 a support part supporting the preform; and
 a conveying unit including a rotating plate, the conveying unit conveying the support part to the blow molding unit in accordance with rotation of the rotating plate,
 wherein the blow molding unit includes:
  a first mold that subjects the preform to heat-set blowing at a first temperature;
  a second mold that blow-molds an intermediate molded article, which has been blow-molded by the heat-set blowing, at a second temperature lower than the first temperature, thereby manufacturing a container; and
  a movement unit capable of moving the first mold and the second mold relative to the support part so as to perform the heat-set blowing and the blow molding the intermediate molded article continuously, the movement unit including:
   a fixed part having a long and plate shape;
   a first moveable part having a plate shape and capable of moving on the fixed part along a longitudinal direction of the fixed part; and a second moveable part having a plate shape and capable of moving on the first moveable part in a direction perpendicularly intersecting with the longitudinal direction, wherein the first mold and the second mold are fixed on the second moveable part.

2. The blow molding device according to claim 1,
wherein a position at which the support part supports the preform in the heat-set blowing and a position at which the support part supports the intermediate molded article in the blow molding the intermediate molded article are the same.

3. The blow molding device according to claim 1,
wherein the first mold has a first inner wall surface that defines a first space in which the preform is disposed,
wherein the second mold has a second inner wall surface that defines a second space in which the intermediate molded product is disposed, and
wherein the first space is larger than the second space.

4. The blow molding device according to claim 1, further comprising
a temperature adjustment unit that performs a temperature adjustment processing that makes a temperature distribution of the preform manufactured by the injection molding unit become close to a uniform temperature distribution,
wherein the blow molding unit performs the heat-set blowing for the preform that has been subjected to the temperature adjustment processing by the temperature adjustment unit.

5. A blow molding method comprising:
injection molding a bottomed preform made of resin; and
continuous blow molding including:
    subjecting the preform manufactured by the injection molding to heat-set blowing at a first temperature by using a first mold; and
    blow molding an intermediate molded article, which has been blow-molded by the heat-set blowing, at a second temperature lower than the first temperature by using a second mold, thereby manufacturing a container,
wherein the injection molding is performed by an injection molding unit provided on a base, and the continuous blow molding is performed by a blow molding unit provided on the base,
wherein the preform is conveyed to the blow molding unit in accordance with rotation of a rotating plate, and
wherein a movement unit capable of moving the first mold and the second mold relative to a support part supporting the perform is provided so as to perform the heat-set blowing and the blow molding the intermediate molded article continuously, the movement unit including:
    a fixed part having a long and plate shape;
    a first moveable part having a plate shape and capable of moving on the fixed part along a longitudinal direction of the fixed part; and
    a second moveable part having a plate shape and capable of moving on the first moveable part in a direction perpendicularly intersecting with the longitudinal direction,
wherein the first mold and the second mold are fixed on the second moveable part.

6. The blow molding method according to claim 5, further comprising:
temperature adjusting the preform manufactured by the injection molding to make a temperature distribution of the preform manufactured by the injection molding become close to a uniform temperature distribution after the injection molding,
wherein the heat-set blowing is performed for the preform that has been subjected to the temperature adjusting.

7. The blow molding method according to claim 5,
wherein the first temperature is a temperature at which crystallization of polyethylene terephthalate is promoted.

8. The blow molding device according to claim 1,
wherein the blow molding unit includes:
    a first bottom mold fixed to a lower part of an inner surface of the first mold, the first bottom mold being movable up and down by an elevation device;
    a second bottom mold fixed to a lower part of an inner surface of the second mold, the second bottom mold being movable up and down by the elevation device;
    a first coupling mechanism that couples the first bottom mold to the elevation device; and
    a second coupling mechanism that couples the second bottom mold to the elevation device, and
wherein the fixed part, the first moveable part, and the second moveable part each are provided with a hole into which the first coupling mechanism, the second coupling mechanism, and the elevation device are insertable.

9. The blow molding device according to claim 8,
wherein the first mold includes a pair of first split mold fixing plates,
wherein one of the pair of first split mold fixing plates is provided with a bottom mold fixing plate to which the first bottom mold is fixed, and
wherein the first coupling mechanism is coupled to a lower surface of the bottom mold fixing plate.

10. The blow molding device according to claim 8,
wherein the second mold includes a pair of second split mold fixing plates,
wherein one of the pair of second split mold fixing plates is provided with a bottom mold fixing plate to which the second bottom mold is fixed, and
wherein the second coupling mechanism is coupled to a lower surface of the bottom mold fixing plate.

11. The blow molding device according to claim 8,
wherein the first coupling mechanism includes a shaft part hanging down from the first bottom mold and a coupling block coupled to the elevation device.

12. The blow molding device according to claim 8,
wherein the second coupling mechanism includes a shaft part hanging down from the second bottom mold and a coupling block coupled to the elevation device.

* * * * *